(12) United States Patent
Chajec et al.

(10) Patent No.: US 11,975,279 B2
(45) Date of Patent: May 7, 2024

(54) FLUID FILTER ASSEMBLY WITH A FILTER CARTRIDGE AND HOUSING INTERFACE

(75) Inventors: Zdzislaw W. Chajec, Saline, MI (US); Michael J. Centlivre, Saline, MI (US); Brian J. Terry, Livingston, TN (US); Carey A. Curt, Cookeville, TN (US)

(73) Assignee: Davco Technology, LLC, Saline, MI (US)

( * ) Notice: Subject to any disclaimer, the term of this patent is extended or adjusted under 35 U.S.C. 154(b) by 621 days.

(21) Appl. No.: 13/349,183

(22) Filed: Jan. 12, 2012

(65) Prior Publication Data
US 2013/0180898 A1    Jul. 18, 2013

(51) Int. Cl.
| | | |
|---|---|---|
| *B01D 35/30* | (2006.01) | |
| *B01D 35/153* | (2006.01) | |
| *B01D 36/00* | (2006.01) | |

(52) U.S. Cl.
CPC .......... *B01D 35/30* (2013.01); *B01D 35/153* (2013.01); *B01D 36/003* (2013.01); *B01D 2201/291* (2013.01); *B01D 2201/316* (2013.01); *B01D 2201/4046* (2013.01); *B01D 2201/52* (2013.01)

(58) Field of Classification Search
CPC .... B01D 2201/4053; B01D 2201/4061; B01D 2201/291; B01D 2201/295; B01D 2201/296; B01D 2201/316; B01D 35/306; B01D 27/08; B01D 2201/4046
See application file for complete search history.

(56) References Cited

U.S. PATENT DOCUMENTS

| | | | |
|---|---|---|---|
| 2,311,320 A * | 2/1943 | Williams | B01D 27/08 |
| | | | 210/133 |
| 4,715,952 A * | 12/1987 | Casey, Jr. | B01D 61/08 |
| | | | 210/136 |
| 5,186,829 A | 2/1993 | Janik | |
| 5,266,195 A | 11/1993 | Hopkins | |
| 5,837,137 A | 11/1998 | Janik | |
| 6,555,000 B2 | 4/2003 | Knight | |
| 6,635,175 B2 | 10/2003 | Stankowski | |
| 6,936,169 B2 | 8/2005 | Baumann et al. | |
| 7,763,170 B2 | 7/2010 | Bassett et al. | |

(Continued)

FOREIGN PATENT DOCUMENTS

| | | |
|---|---|---|
| CN | 1753715 A | 3/2006 |
| DE | 10052524 A1 | 4/2002 |

(Continued)

OTHER PUBLICATIONS

European Patent Search Report for EP Patent No. EP 20 15 6757, completed on Jul. 7, 2020.

*Primary Examiner* — Jason M Greene
*Assistant Examiner* — Eric J McCullough
(74) *Attorney, Agent, or Firm* — Young Basile Hanlon & MacFarlane, P.C.

(57) ABSTRACT

A fluid filter assembly having a filter cartridge and housing interface to indicate whether a replacement filter cartridge is proper and desirable for the fluid filter assembly. A substantially cylindrical interface is connected to and extends from the filter cartridge and is matingly received by a bore provided in a boss of a housing of the fluid filter assembly. A means for indicating at least one characteristic of the filter cartridge is provided to ensure the replacement filter cartridge is proper and desirable for the fluid filter assembly.

19 Claims, 5 Drawing Sheets

(56) References Cited

U.S. PATENT DOCUMENTS

| | | | |
|---|---|---|---|
| 7,959,010 B2 | 6/2011 | Hawkins et al. | |
| 2002/0144938 A1 | 10/2002 | Hawkins et al. | |
| 2003/0196947 A1 | 10/2003 | Gundrum et al. | |
| 2004/0154975 A1* | 8/2004 | Girondi | B01D 29/21 210/446 |
| 2005/0167352 A1* | 8/2005 | Burrows | B01D 35/153 210/241 |
| 2006/0060512 A1 | 3/2006 | Astle et al. | |
| 2009/0152188 A1 | 6/2009 | Hacker | |
| 2009/0230048 A1 | 9/2009 | Braunheim | |
| 2010/0025317 A1* | 2/2010 | Fall et al. | |
| 2010/0108590 A1* | 5/2010 | Curt | B01D 29/21 210/232 |
| 2010/0116728 A1* | 5/2010 | Namur | C02F 9/005 210/209 |
| 2010/0288687 A1 | 11/2010 | Bassett et al. | |
| 2011/0073538 A1 | 3/2011 | Jiang et al. | |
| 2013/0062266 A1* | 3/2013 | Horner | B01D 63/06 137/15.01 |
| 2013/0068670 A1* | 3/2013 | Kruckenberg | B01D 35/30 210/85 |

FOREIGN PATENT DOCUMENTS

| | | | |
|---|---|---|---|
| WO | WO 0213944 A2 * | 2/2002 | B01D 35/30 |
| WO | 2007053228 A2 | 5/2007 | |
| WO | 2008021904 A1 | 2/2008 | |
| WO | 2009051757 A1 | 4/2009 | |
| WO | 2010117799 | 10/2010 | |
| WO | 2010117799 A3 | 12/2010 | |

\* cited by examiner

FLUID FILTER ASSEMBLY WITH A FILTER CARTRIDGE AND HOUSING INTERFACE

FIELD OF THE INVENTION

The present invention relates to fluid filter assemblies, and more particularly, a fluid filter assembly having an interface between a fluid filter cartridge and a housing, wherein the interface assures the replacement of a proper fluid filter cartridge.

BACKGROUND OF THE INVENTION

Many types of fuel filter assemblies (also referred to as "separators") are known in the prior art. A typical fuel filter assembly utilizes an enclosed housing, whereby a disposable cylindrical fuel filter cartridge is disposed within the housing in order to filter impurities from the fuel before the fuel is delivered to other system components, such as fuel injection pumps and fuel injectors of an internal combustion engine. As the fuel filter cartridge becomes dirtied and clogged with contaminants, the fuel filter cartridge must be periodically replaced. In practice, the fuel filter cartridge requirements may vary depending upon such characteristics as the type and make of the engine, the specific application for which the engine is employed, the climate in which the engine is operated, and/or the regional characteristics of the fuel supply quality. The fuel filter cartridges which are suitable for replacement commonly vary as to axial dimensions, capacity, and filter media qualities. Such characteristics may affect the cost and ease of replacing the fuel filter cartridges, but they may create other concerns as well.

One of the recurring problems in assuring quality fuel filter performance is to ensure that the replacement fuel filter cartridge be compatible with the filtering requirements of the engine's fuel system. Because of the numerous types of fuel filter cartridges and the various manufacturers that produce them, a replacement fuel filter cartridge may dimensionally conform to the base of a given fuel filter assembly, thereby making it appear that the replacement fuel filter cartridge is a proper replacement. However, the replacement fuel filter cartridge may not comply with the applicable specifications of a given fuel filter assembly, thereby jeopardizing the integrity of the engine's fuel filtering system. The replacement of the original fuel filter cartridge with an incompatible fuel filter cartridge can have serious consequences on the operation of the internal combustion engine and may create greater maintenance expenses than the less costly suitable replacement fuel filter cartridges.

In practice, the owner of the vehicle and/or the maintenance technician servicing the internal combustion engine are frequently unaware of the fuel filter cartridges specifications and requirements and may unknowingly jeopardize the integrity of the fuel filtering system by replacing the original fuel filter cartridge with a wholly unsuitable fuel filter cartridge, even though the unsuitable fuel filter cartridge may visibly appear to be suitable. There are also, of course, instances where inferior or improper replacement fuel filter cartridges are intentionally installed without the knowledge of the owner or the operator of the vehicle. For instance, fuel filter cartridges having filter medias with different porous sizes and/or filtration capabilities may have identical mounting configurations and may fit on the same housing of the fluid filter assembly, yet the different porous sizes and/or filtration capabilities of the filter medias will greatly affect the filtering performance of the fuel filter cartridge.

It would be desirable to provide a fluid filter assembly having an interface between a fuel filter cartridge and a housing that assured for the replacement of a proper fuel filter cartridge. It would also be desirable to provide the owner and/or operator of the vehicle with an indicator that the fuel filter cartridge has been properly or improperly replaced.

SUMMARY OF THE INVENTION

The present invention provides a fluid filter assembly having an interface between a filter cartridge and a housing to ensure for the replacement of a proper filter cartridge. The fluid filter assembly provides the housing with a boss formed therein, wherein the boss has a first diameter bore. The filter cartridge is disposed within the housing for filtering the fluid within the housing. A substantially cylindrical interface is connected to and extends from the filter cartridge, and the interface is matingly received by the first diameter bore of the boss for securing and locating the filter cartridge in the housing. A means for identifying at least one characteristic of the filter cartridge is provided to ensure that the filter cartridge is proper for the fluid filter assembly.

The means for identifying the at least one characteristic of the filter cartridge may include a protrusion formed on one of either the interface or the boss, wherein the protrusion may have a predetermined size corresponding to the at least one characteristic of the filter cartridge. An aperture is formed in the other of the interface and the boss as the protrusion, and the aperture has a predetermined size corresponding to the at least one characteristic of the filter cartridge, wherein the protrusion matingly engages the aperture if the at least one characteristic of the filter cartridge is desirable, and wherein the protrusion cannot matingly engage the aperture if the at least one characteristic of the filter cartridge is not desirable.

In another embodiment, the means for identifying the at least one characteristic of the filter cartridge may include a magnet disposed in a predetermined position on a free end of the interface, wherein the predetermined position of the magnet corresponds to the at least one characteristic of the filter cartridge. A proximity sensor is disposed within the bottom surface of the boss in the housing, wherein the bottom surface defines a bottom of the first diameter bore. The proximity sensor senses the position of the magnet and provides a signal indicating whether the at least one characteristic of the filter cartridge is desirable.

In yet another embodiment, the means for identifying the at least one characteristic of the filter cartridge may include a magnet disposed in a predetermined position in the interface, wherein the magnet has a predetermined magnetic strength corresponding to the at least one characteristic of the filter cartridge. A proximity sensor is disposed within the boss of the housing and senses the magnetic strength of the magnet. The proximity sensor provides a signal corresponding to the predetermined magnetic strength of the magnet indicating whether the at least one characteristic of the filter cartridge is desirable.

In even yet another embodiment, the means for identifying the at least one characteristic of the filter cartridge may include a radio-frequency identification (RFID) tag disposed within the interface, wherein the RFID tag stores electronic information regarding the filter cartridge. An RFID reader is disposed within the boss in the housing, wherein the RFID reader transmits and receives a signal to and from the RFID tag, respectively, indicating whether the filter cartridge is desirable for the fluid filter assembly.

A further embodiment of the means for identifying the at least one characteristic of the filter cartridge may include the boss of the housing having a second diameter bore extending below and in communication with the first diameter bore, wherein the second diameter bore may be smaller than the first diameter bore, and the second diameter bore is non-coaxially aligned with the first diameter bore. A substantially cylindrical riser pipe may be matingly received within a through bore in the cylindrical interface wherein the cylindrical interface and the cylindrical riser pipe are non-coaxially aligned. The cylindrical interface matingly engages the first diameter bore, and the cylindrical riser pipe matingly engages the second diameter bore for properly positioning and securing the filter cartridge to the housing and indicating whether the at least one characteristic of the filter cartridge is desirable.

A controller may be utilized for receiving and interpreting the signals from the proximity sensor, wherein the controller may provide an indicator as to whether the at least one characteristic of the filter cartridge is desirable. The controller may also be utilized for receiving and interpreting the signal from the RFID reader, wherein the controller may provide an indicator as to whether the filter cartridge is desirable for the fluid filter assembly.

BRIEF DESCRIPTION OF THE DRAWINGS

The description herein makes reference to the accompanying drawings, wherein like-referenced numerals refer to like parts throughout several views, and wherein.

DETAILED DESCRIPTION OF THE EMBODIMENTS

Referring to the drawings, the present invention will now be described in detail with reference to the preferred embodiment.

The present invention provides a fluid filter assembly having a fluid filter cartridge and housing interface for ensuring that the filter cartridge is proper for the fluid filter assembly. As seen in FIGS. 1-8, a fluid filter assembly 10 provides an enclosed housing 12 having a lower portion 14 and an upper portion 16. The housing 12 houses a fluid filter cartridge 18 for filtering a fluid (not shown), such as diesel fuel, within the housing 12. An interface 72 is connected to and extends from the filter cartridge 18 and is seated in the lower portion 14 of the housing 12. A means for identifying 21 specific characteristics and information regarding the filter cartridge 18 may be provided in the interface 72 and the lower portion 14 of the housing 12 to ensure that the current and/or replacement filter cartridge 18 is desirable and proper for the fluid filter assembly 10.

Figure 1:
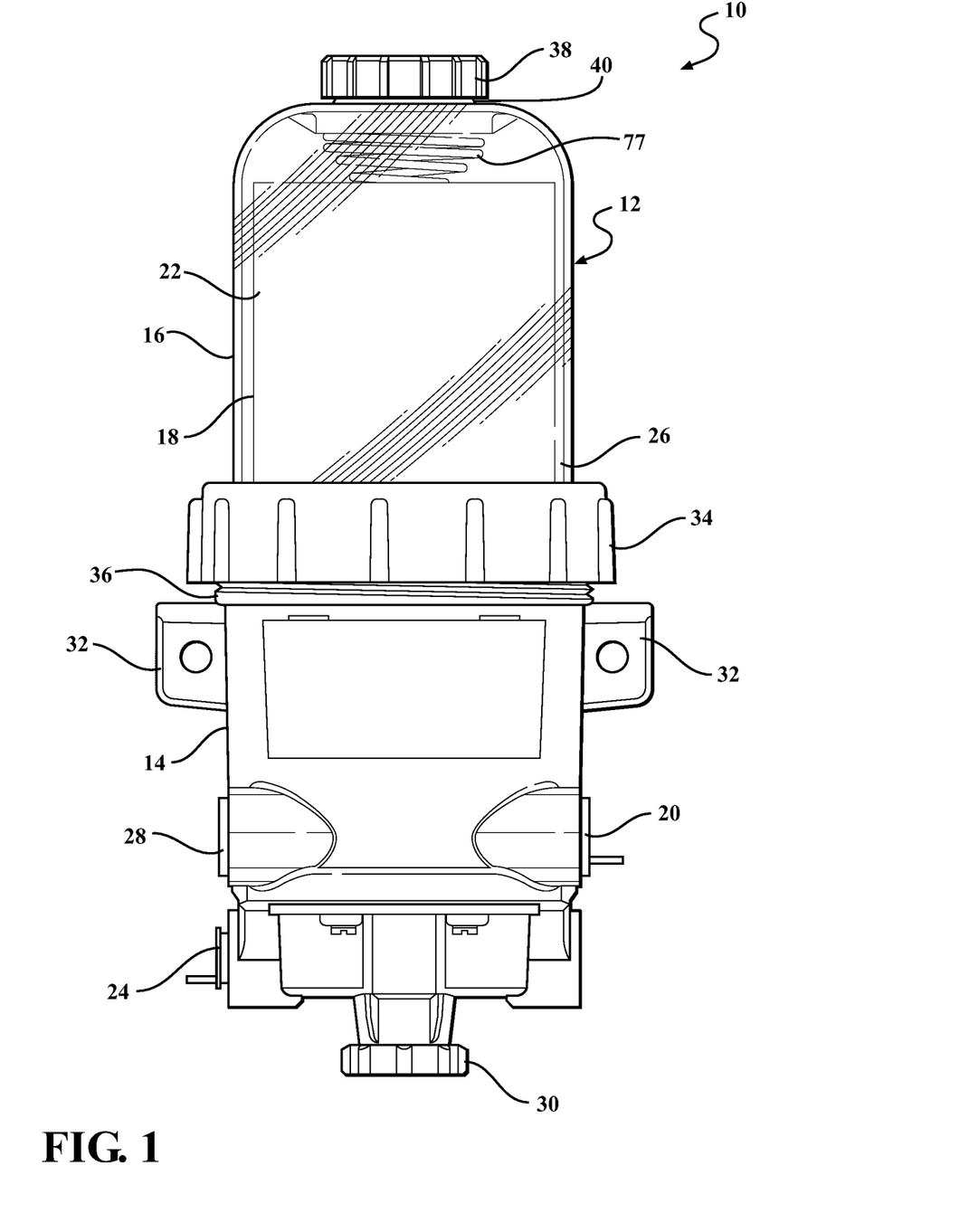
FIG. 1 is a front view of the fuel filter assembly of the present invention.
Figure 2:
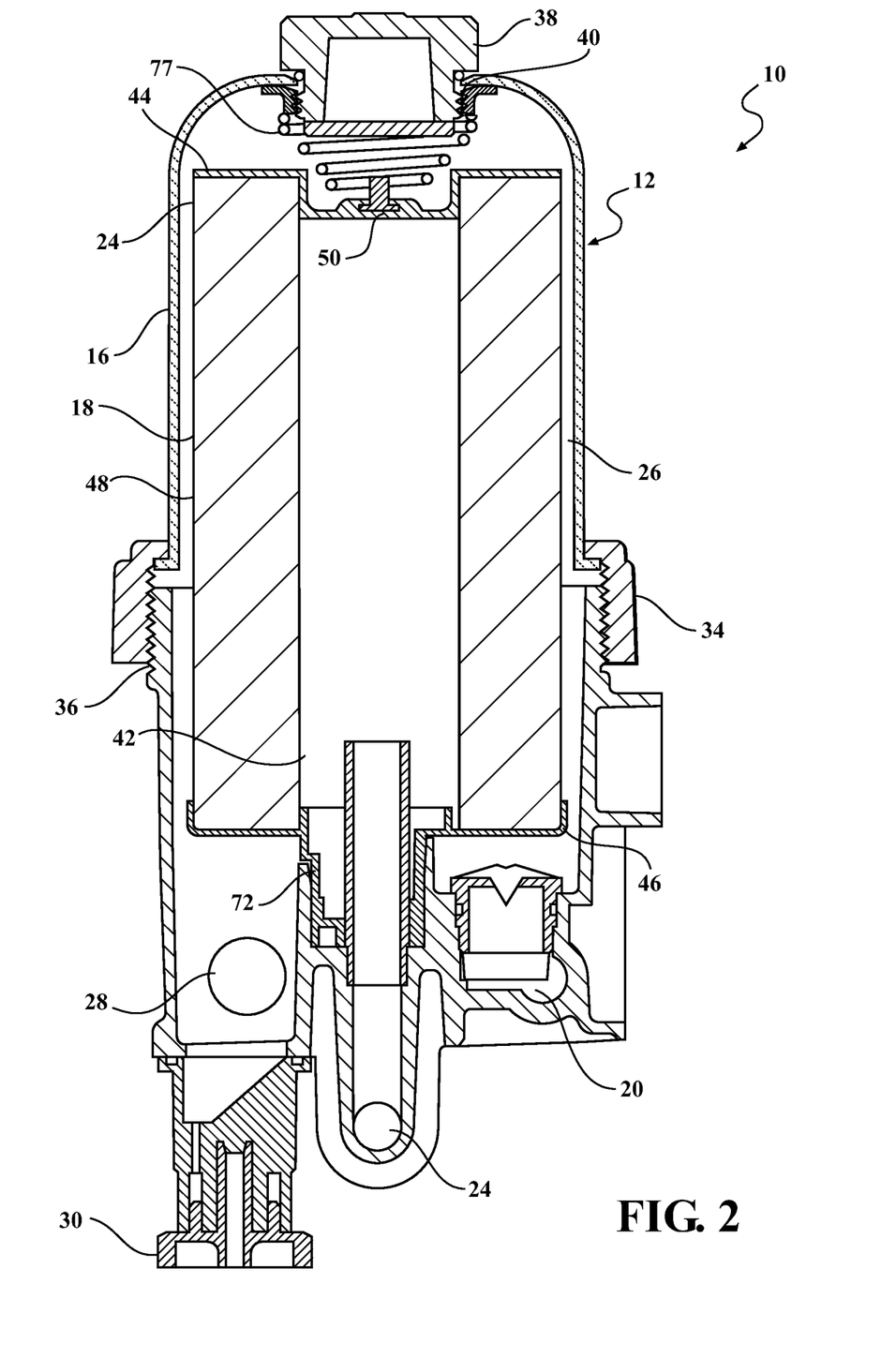
FIG. 2 is a sectional view of the fuel filter assembly of the present invention.

As seen in FIGS. 1 and 2, the lower portion 14 of the housing 12 provides a fluid inlet 20 for receiving the fluid into the housing 12. The fluid is filtered in the housing 12 by passing through a filter media 22 provided in the filter cartridge 18 wherein the fluid passes from the outside of the filter media 22 to the inside of the filter media 22. Once the fluid passes through the filter media 22 of the filter cartridge 18, the filtered fluid passes through to a fluid outlet 24 provided in the lower portion 14 of the housing 12. The filtered fluid is then directed to the next component of the fluid filtering system downstream from the fluid filter assembly 10, such as a lift pump (not shown) or low pressure pump (not shown) followed by fuel injection pumps (not shown) and fuel injectors (not shown) of an internal combustion engine (not shown). Although the fluid filter assembly 10 of the present invention is ideally suited for fuel filtering systems of internal combustion engines, it is anticipated that the fluid filter assembly 10 of the present invention may be utilized for any number of fluid filtering systems that require the use of a replaceable filter cartridge 18.

To direct fluid to and from the housing 12, the housing 12 of the fluid filter assembly 10 of the present invention includes the lower portion 14 of the housing 12 fabricated from a lightweight, high-strength material, such as cast aluminum. The lower portion 14 of the housing 12 provides the fluid inlet 20 for receiving a supply of non-filtered fluid into the housing 12. The fluid inlet 20 is in communication with an enclosure filtering chamber 26 formed within the housing 12. The lower portion 14 of the housing 12 also provides the fluid outlet 24 which directs filtered fluid away from the filtering chamber 26 of the housing 12 to the other components downstream of the fluid filter assembly 10. The lower portion 14 of the housing 12 may also include heater ports 28 which allow for fluid heaters (not shown) to be housed within the lower portion 14 of the housing 12. Fluid heaters may be utilized to heat the fluid, such as diesel fuel, which melt wax paraffins that often form in diesel fuel under colder conditions. A drain 30 may also be provided within the lower portion 14 of the housing 12. The drain 30 may be utilized to drain water and other contaminants from the housing 12 that may settle from the fluid in the lower portion 14 of the housing 12. Brackets 32 may also be incorporated onto the lower portion 14 of the housing 12 to allow the fluid filter assembly 10 to be mounted to a structure (not shown), such as an internal combustion engine, internal combustion engine supports, or an engine compartment of a vehicle.

In order to form the enclosure or filtering chamber 26 in the housing 12 of the fluid filter assembly 10, the upper portion 16 of the housing 12 is formed of a transparent or translucent cover that is removably connected to the lower portion 14 of the housing 12. A threaded annular collar 34 engages the upper portion 16 of the housing 12 and is removably threaded onto an outer annular threaded portion 36 of the lower portion 14 of the housing 12. A flexible annular seal (not shown) is provided between the lower portion 14 and the upper portion 16 of the housing 12 to prevent any leaking of the fluid between the lower portion 14 and the upper portion 16 of the housing 12. A vent cap 38 is also threaded into a threaded aperture 40 provided in the top of the upper portion 16 of the housing 12. The vent cap 38 is removably threaded into the threaded aperture 40 of the upper portion 16 of the housing 12 to allow atmospheric pressure into the enclosure 26 of the housing 12 prior to removing the filter cartridge 18 from the housing 12.

Figure 4:
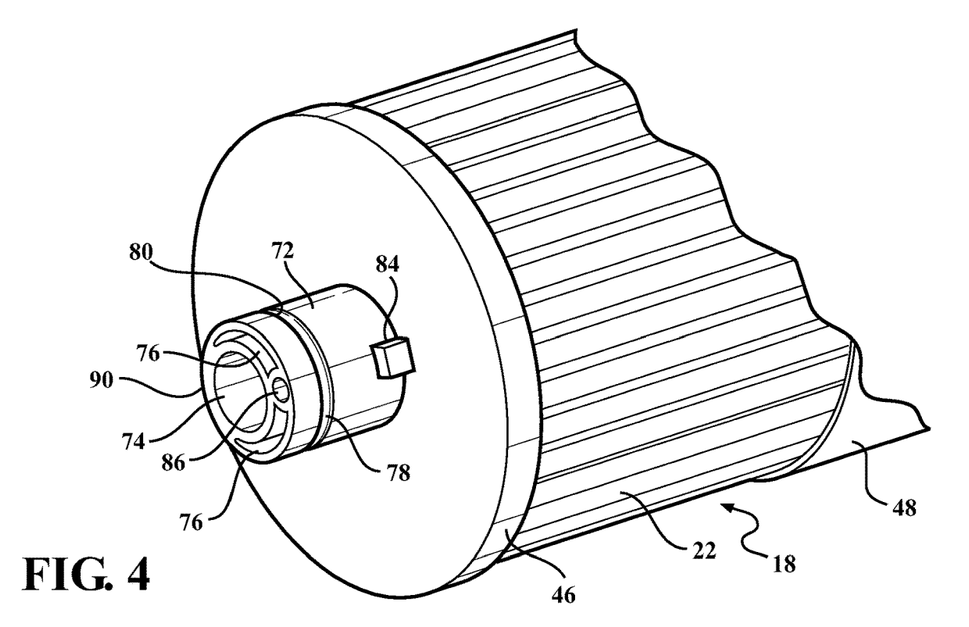
FIG. 4 is a perspective view of the interface of the fuel filter assembly of the present invention.
Figure 7:
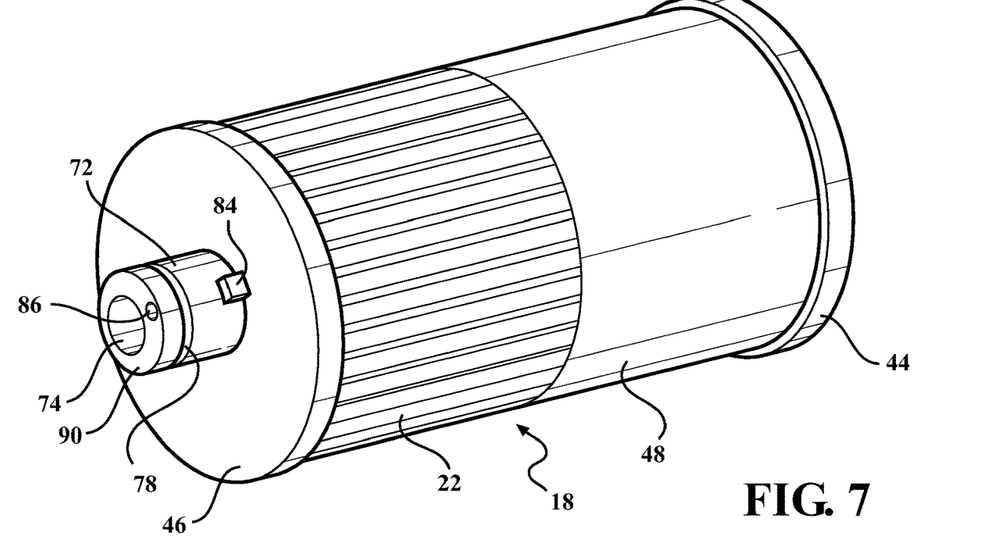
FIG. 7 is a perspective view of the filter cartridge and the interface of the fuel filter assembly of the present invention.

To filter the fluid, the fluid filter assembly 10 of the present invention houses the filter cartridge 18 within the filtering chamber 26 of the housing 12. The filter cartridge 18 has a substantially cylindrical configuration that is mounted in a substantially vertically upright position within the housing 12 of the fluid filter assembly 10. The filter cartridge 18 includes the filter media 22 which is fabricated from a pleated, porous material, such as paper or other filter media, as seen in FIGS. 2, 4 and 7. The filter media 22 forms a substantially cylindrical configuration, wherein a hollow inner tubular configuration 42 is formed within the cylindrically-formed filter media 22 and is in communication with the fluid outlet 24. A porous substantially cylindrical tube (not shown) may be used to support the inner tubular configuration 42 of the filter media 22. A top end cap 44 and a bottom end cap 46 are connected to each end of the cylindrically-formed filter media 22 in order to maintain the cylindrical shape of the filter media 22. A solid outer wrap 48 may be connected to and extend down from the top end cap 44 and overlie a portion of the exterior of the filter media 22. A relief valve 50 may also be incorporated into the top end cap 44 of the filter cartridge 18 so as to allow for the release of pressure upon the pressure differential across the filter media 22 reaching a predetermined level. The outer wrap 48 and the relief valve 50 of the filter cartridge 18 allow the fuel level to rise within the filtering chamber 26 between the upper portion 16 of the housing 12 and the outer surface of the filter media 22 as the filter media 22 within the filter cartridge 18 becomes more dirtied and contaminated. The translucent or transparent material of the upper portion 16 of the housing 12 allows a user to view the fluid level within the housing 12, thereby indicating the life of the filter cartridge 18, as the life of filter cartridge 18 decreases with the increased height of the fluid level within the housing 12. Once the fluid level reaches the uppermost portions of the filtering chamber 26, the filter cartridge 18 is replaced.

Figure 5:
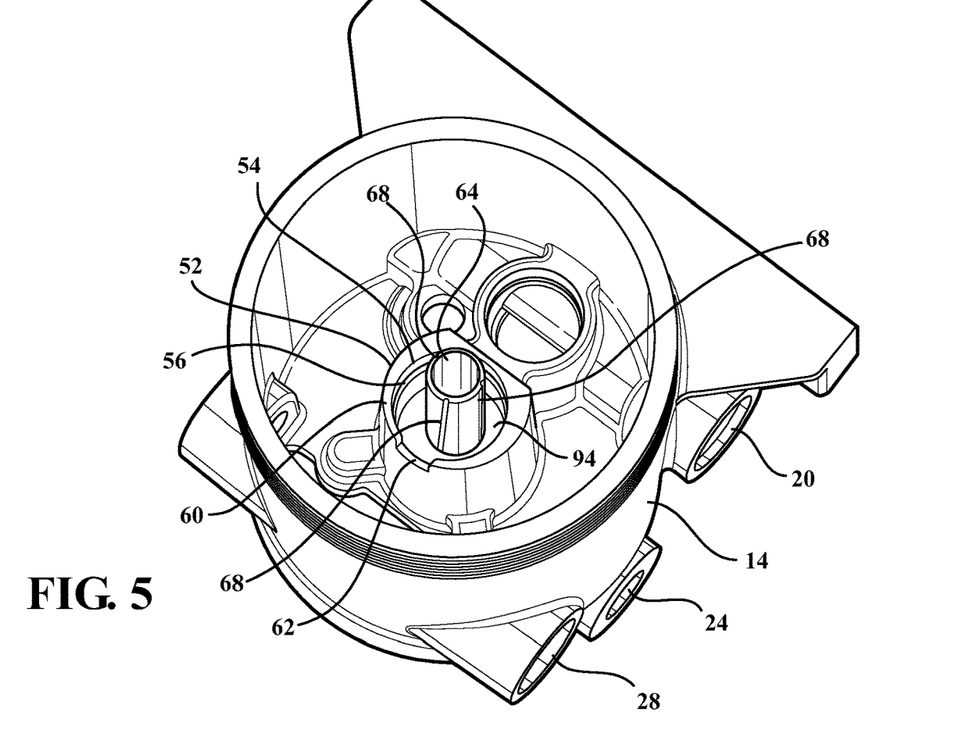
FIG. 5 is a perspective view showing the housing and the riser pipe of the fuel filter assembly of the present invention.
Figure 8:
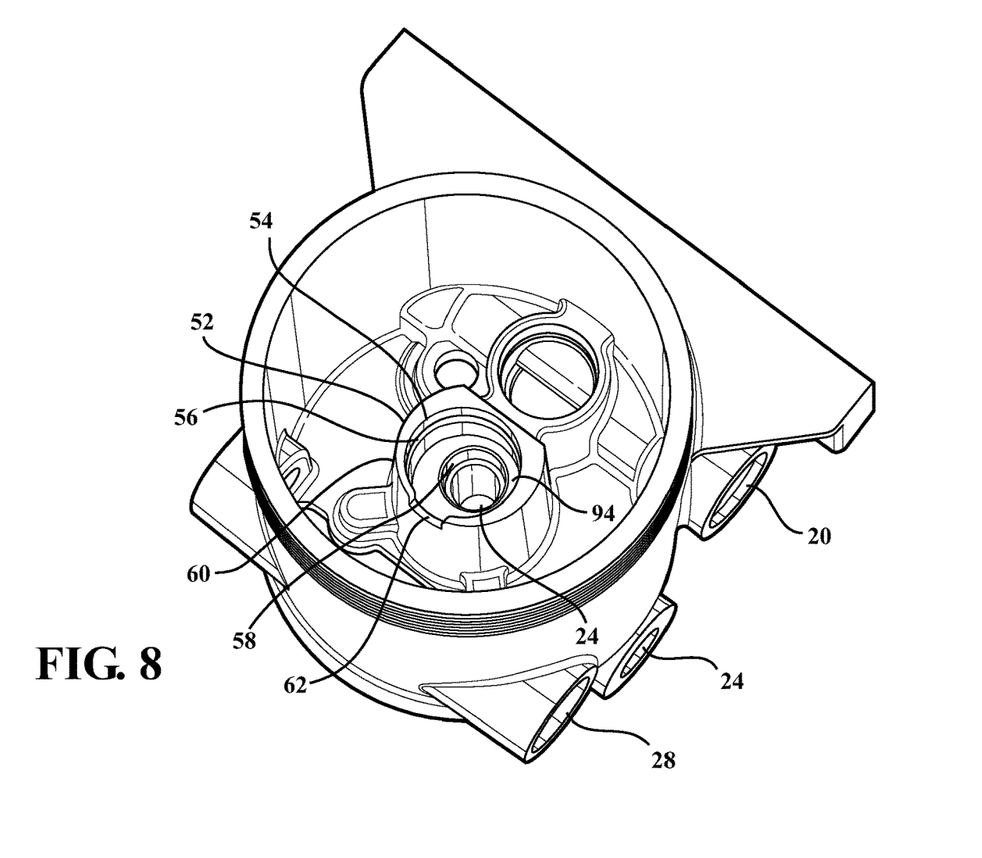
FIG. 8 is a perspective view of the housing of the fuel filter assembly of the present invention without a riser pipe.

In order to ensure that upon replacing the filter cartridge 18, the filter cartridge 18 is replaced with a filter cartridge 18 that meets all of the specifications of the fluid filter assembly 10, the lower portion 14 of the housing 12 provides a boss 52 that is integrally-formed in the lower portion 14 of the housing 12, as best seen in FIGS. 5 and 8. The boss 52 has a stepped diameter bore 54 that is in fluid communication with the fluid outlet 24. The stepped diameter bore 54 has a first diameter bore 56 and a second diameter bore 58 that are in fluid communication with one another. The first diameter bore 56 is larger than the second diameter bore 58, and the first diameter bore 56 is not coaxially aligned with the second diameter bore 58. That is, the first diameter bore 56 does not share a longitudinal axis with the second diameter bore 58. A portion of a wall 60 of the boss 52 that defines the first diameter bore 56 has an open-ended aperture 62 formed in the wall 60 of the boss 52. The open-ended aperture 62 has a predetermined size that correlates to a specific characteristic of the filter cartridge 18, as will be further described later in the specification.

Figure 3:
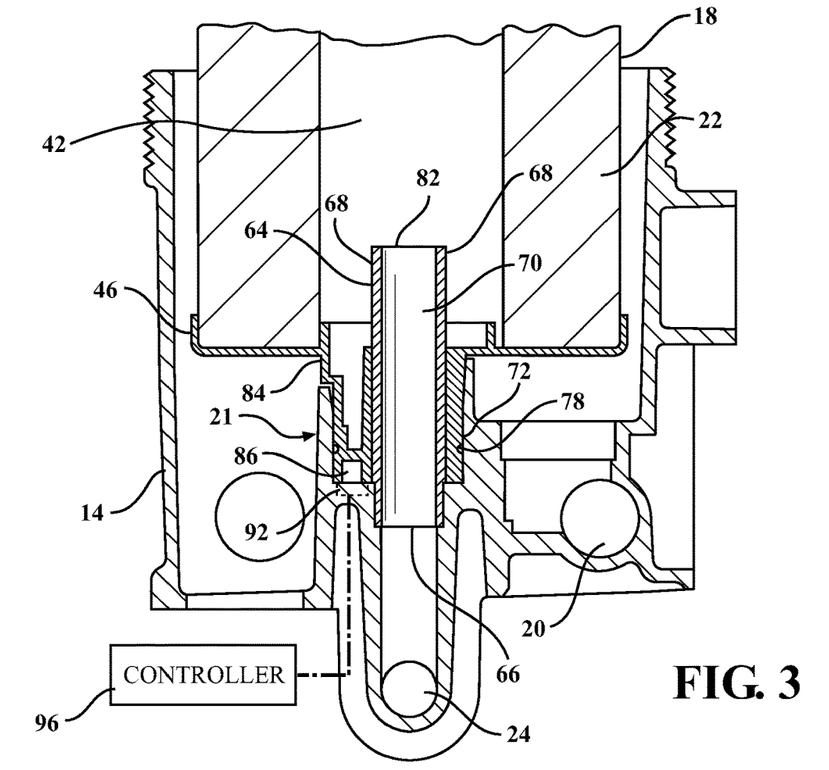
FIG. 3 is a sectional view showing the interface and riser pipe of the fuel filter assembly of the present invention.
Figure 6:
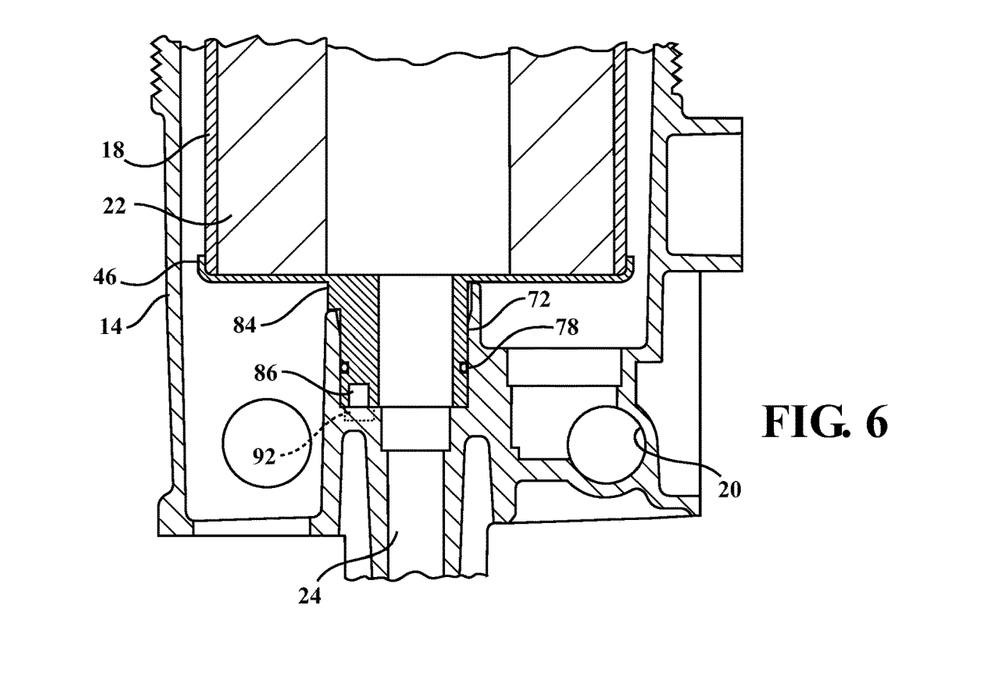
FIG. 6 is a sectional view of the interface of the fuel filter assembly of the present invention without a riser pipe.

To properly position and secure the filter cartridge 18 within the housing 12 of the fuel filter assembly 10, a substantially cylindrical riser pipe 64 has one end 66 matingly received and press fit within the second diameter bore 58 of the boss 52, as best seen in FIGS. 3 and 5. The riser pipe 64 extends vertically upward from the boss 52 and is received by the interface 72 of the filter cartridge 18, as will be described later in the specification. A second and opposite end 82 of the riser pipe extends into the inner tube 42 of the filter media 22 thereby directing filtered fluid from the inner tube 42 to the fluid outlet 24. The riser pipe 64 may have at least one semi-circular groove 68 that extends axially along an outer surface 70 of the riser pipe 64. As seen in FIG. 5, there are three grooves 68 disclosed in the subject specification. The grooves 68 ensure that non-compliant filter cartridges 18 that do not have proper seals are not utilized. Although the riser pipe 64 assists in piloting the interface 72 into the boss 52 of the lower housing 14, the fluid filter assembly 10 of the present invention may be used without the riser pipe 64, as shown in FIGS. 6 and 8.

The substantially cylindrical interface 72 of the filter cartridge 18 extends integrally away from the bottom end cap 46 of the filter cartridge 18, as seen in FIGS. 4 and 7. The interface 72 is not coaxially aligned with the longitudinal axis of the filter cartridge 18; however, the interface 72 has a throughbore 74 which is coaxially aligned with the longitudinal axis of the filter cartridge 18. The wall of the interface 72 separating the outer diameter of the interface 72 and the through bore 74 may have relief pockets or slots 76 formed therein, which are created during the molding operation of the interface 72, as seen in FIG. 4. Of course, if other manufacturing processes are utilized to create the interface 72, then the interface 72 may have solid walls as shown in FIG. 7. A flexible annular seal 78 may be seated within an annular recess 80 provided in the exterior surface of the interface 72. When the filter cartridge 18 is seated in the lower portion 14 of the housing 12, the second end 82 of the riser pipe 64 is inserted and received by the through bore 74 in the interface 72, as seen in FIG. 3. The riser pipe 64 extends through the through bore 74 and into the inner tube 42 of the filter media 22 and directs filtered fluid from the interior of the filter media 22 to the fluid outlet 24. A compression spring 77 is seated within the enclosure 26 between the top end cap 44 of the filter cartridge 18 and the upper portion 16 of the housing 12 to ensure the interface 72 stays seated and secured in the boss 52 by biasing the filter cartridge 18 downward toward the lower portion 14 of the housing 12, as seen in FIG. 2.

In order to indicate whether the filter cartridge 18 is proper and desirable for the fluid filter assembly 10, the means for identifying specific characteristics and information regarding the filter cartridge 18 is provided, as seen in FIGS. 3-8. Such characteristics may include the micron rating of the filter media 22, the filter capacity of the filter cartridge 18, the water separation capabilities of the filter media 22, the manufacturer of the filter cartridge 18, the manufactured date of the filter cartridge 18, the origin country of the filter cartridge 18, and/or the replacement date of the filter cartridge 18. In one embodiment, the identifying means 21 provides a protrusion 84 formed on the outer surface of the interface 72 with a portion of the protrusion 84 being adjacent the bottom end cap 46 of the filter cartridge 18. The protrusion 84 has a substantially rectangular configuration that extends radially outward from the outer surface of the interface 72. The protrusion 84 has a predetermined size that may correlate to certain characteristics of the filter cartridge 18, such as the micron rating of the filter media 22 in the filter cartridge 18, and may be received by the open-ended aperture 62 provided in the boss 52 in the lower portion 14 of the housing 12. The open-ended aperture 62 also has a predetermined size that may correlate to certain characteristics of the filter cartridge 18, such as a micron rating that is desirable and proper for the fluid filter assembly 10. If the open-ended aperture 62 is large enough to receive the protrusion 84, then the filter cartridge 18 is proper and desirable for the fluid filter assembly 10. If the protrusion 84 cannot fit within the open-ended aperture 62, then the filter cartridge 18 is not proper and desirable for the fluid filter assembly 10, and the filter cartridge should be removed from the fluid filter assembly 10.

For instance, the filter media 22 may have a micron rating of 4 microns, 7 microns, 10 microns, 25 microns, or 50 microns. Thus, the size of the protrusion 84 increases with the micron rating of the filter media 22. The open-ended aperture 62 has a similar size correlation to the micron rating of the filter media 22. Therefore, if the fluid filter assembly 10 requires a filter media 22 having a 10 micron rating, then any filter cartridge 18 having a filter media 22 with a micron rating greater than 10 microns, i.e. 25 microns or 50 microns, will not fit within the lower portion 14 of the housing 12, as the protrusions 84 would be too large to fit within the open-ended aperture 62 of the boss 52. However, if the filter cartridge 18 contains a filter media 22 having a micron rating of 10 microns or smaller, i.e. 7 microns or 4 microns, then the filter cartridge 18 would fit within the lower portion 14 of the housing 12, as the protrusion 84 would be small enough to fit within the open-ended aperture 62. Although the open-ended aperture 62 may be sized for a filter media 22 having a 10 micron rating, the fluid filter assembly 10 could also accept the filter media 22 having a smaller micron rating, since this would indicate that the filter media 22 would provide a higher level of filtration, which would still be acceptable for a fluid filter assembly 10 requiring a filter media 22 having a 10 micron rating. Not only do the protrusion 84 and the open-ended aperture 62 indicate a proper level of filtration, but the mating of the protrusion 84 and the open-ended aperture 62 assures the proper physical location of the filter cartridge 18 relative to the housing 12.

It should be noted that the protrusion 84 and the open-ended aperture 62 may take on other shapes besides those previously described, so long as the protrusion 84 and the open-ended aperture 62 can matingly engage one another. In addition, the present invention anticipates that the protrusion 84 and the open-ended aperture 62 may be located in other locations. For instance, the protrusion 84 may be located on various portions of the boss 52, and the open-ended aperture 62 may be located on the interface 72 or in the bottom end cap 46 of the filter cartridge 18. Again, the protrusion 84 and the open-ended aperture 62 must be in a location where they can matingly engage one another to ensure proper fit of the filter cartridge 18 in the housing 12 so as to indicate that the filter media 22 is proper for the fluid filter assembly 10.

In yet another embodiment, the identifying means 21 provides a permanent magnet 86 mounted within a recess provided in a free end 90 of the interface 72. The magnet 86 is disposed in a predetermined position on the free end 90 of the interface 72, and the position of the magnet 86 may correlate with certain characteristics of the filter cartridge 18, such as the micron rating of the filter media 22 of the filter cartridge 18. A proximity sensor 92 is disposed within the boss 52 in the lower portion 14 of the housing 12 and is mounted in a predetermined position beneath a surface of the boss 52 that defines a bottom surface 94 of the first diameter bore 56 of the stepped diameter bore 54. The position of the proximity sensor 92 correlates to certain characteristics of the filter cartridge 18, such as a desired micron rating of the filter media 22 of the filter cartridge 18 for the fuel filter assembly 10. When the interface 72 is seated within the first diameter bore 56 of the boss 52, the magnet 86 is positioned adjacent the bottom surface 94 of the first diameter bore 56. When the proximity sensor 92 is aligned directly under the magnet 86, the proximity sensor 92 senses the presence of the magnet 86, thereby establishing that the magnet 86 is in the proper position for the desired filter cartridge 18 and confirming that the micron rating of the filter media 22 is desirable. As previously noted, the position of the magnet 86 on the interface 72 may correspond to a particular micron rating of the filter media 22 of the filter cartridge 18, and thus, the magnet 86 may be located in a different position on the free end 90 of the interface 72 for each of the various micron ratings of the filter media 22. In addition, the position of the proximity sensor 92 may correlate to a micron rating of the filter media 22 that is desirable for the particular fluid filter assembly 10. If the proximity sensor 92 senses the presence of the magnet 86, then the proximity sensor 92 may provide a signal indicating that the micron rating of the filter media 22 is desirable for the fluid filter assembly 10. If the proximity sensor 92 does not sense the presence of the magnet 86, then the proximity sensor 92 may send a different signal or no signal at all indicating that the micron rating of the filter media 22 is not desirable for the fluid filter assembly 10. A controller 96 may be utilized for interpreting the signal from the proximity sensor 92 and providing an indicator to the vehicle or the operator of the vehicle that the micron rating of the filter media 22 in the filter cartridge 18 is either proper and desirable for the fluid filter assembly 10 or improper and undesirable for the fluid filter assembly 10. The indicator may provide a light or a message display on the operating panel of the vehicle indicating that the micron rating of the filter media 22 of the filter cartridge 18 is either desirable or undesirable, or the controller 96 may be linked to the ignition or fuel system of the vehicle. If linked to the ignition or fuel system, the vehicle may be prohibited from starting if the micron rating of the filter media 22 of the filter cartridge 18 is not desirable, or the vehicle may be allowed to start when the micron rating of the filter media 22 of the filter cartridge 18 is desirable.

In yet another embodiment of the fluid filter assembly 10 of the present invention, the identifying means 21 may provide a similar magnet 86 as described in the previous embodiment. The magnet 86 is disposed in a predetermined position in the free end 90 of the interface 72; however, the magnet 86 has varying magnetic characteristics, such as magnetic strength or magnetic polarity, corresponding to certain characteristics of the filter cartridge 18, such as the micron rating of the filter media 22 of the filter cartridge 18. When the interface 72 is seated within the first diameter bore 56 of the boss 52 in the lower portion 14 of the housing 12, the magnet 86 is aligned adjacent to the proximity sensor 92 which is mounted adjacent the bottom surface 94 of the first diameter bore 56, as similarly described in the previous embodiment. The proximity sensor 92 senses the magnetic strength or the polarity of the magnet 86 and provides a signal corresponding to the magnetic strength or polarity of the magnet 86. The controller 96 receives the signal from the proximity sensor 92 and interprets the micron rating of the filter media 22 of the filter cartridge 18 based on the magnetic strength or the polarity of the magnet 86. The controller 96 provides an indicator, as similarly described in the previous embodiment, indicating whether the micron rating of the filter media 22 of the filter cartridge 18 is proper and desirable or improper and undesirable for the particular fluid filter assembly 10.

In even yet another embodiment, the identifying means 21 may utilize radio-frequency identification (RFID) technology for providing various characteristics and information about the filter cartridge 18, including the micron rating of the filter media 22, the type of filter cartridge 18, the manufacturer of the filter cartridge 18, the date the filter cartridge 18 was replaced, etc. In the present embodiment, the magnet 86 in the previous embodiment may be replaced with an RFID tag 86 mounted in the free end 90 of the interface 72. The proximity sensor 92, as described in the previous embodiment, is replaced with an RFID reader 92 within the boss 52 of the lower portion 14 of the housing 12. The RFID tag 86 stores information electronically, such as the information noted above, and when the interface 72 is received within or near the boss 52, the RFID reader 92 transmits an encoded radio signal to interrogate the RFID tag 86. The RFID tag 86 receives the signal from the RFID reader 92 and responds with its identification information. The RFID reader 92 transmits a signal regarding the information received from the RFID tag 86 and indicates whether the filter cartridge 18 is desirable and proper for the particular fluid filter assembly 10. The controller 96 may be utilized to receive and interpret the signal from the RFID reader 92 to determine whether the filter cartridge 18 is desirable for the fluid filter assembly 10. The controller 96 may also provide an indicator, as similarly described in the previous embodiments, to indicate to the vehicle or the operator of the vehicle that the filter cartridge 18 is desirable or not desirable for the fluid filter assembly 10.

In a further embodiment of the identifying means, the first diameter bore 56 and the second diameter bore 58 of the boss 52 in the lower portion 14 of the housing 12 are not coaxially aligned. In addition, the cylindrical interface 72 and the riser pipe 64 are also not co-axially aligned. When the interface 72 is matingly received by the first diameter bore 56, and the riser pipe 64 is matingly received by the second diameter bore 58, then this unique alignment of non-coaxial axes indicates that a proper characteristic of the filter cartridge 18 is present, and thus, the filter cartridge 18 is desirable and proper for the fluid filter assembly 10 and is properly positioned and secured in the housing 12.

In operation, the filter cartridge 18 of the fluid filter assembly 10 may become contaminated and/or clogged by filtering contaminants from the fluid, thereby requiring that the filter cartridge 18 be replaced. The filter cartridge 18 may be replaced by removing the vent cap 38 and allowing the fluid to drain from the housing 12. The collar 34 is unthreaded from the threaded portion 36 of the lower portion 14 of the housing 12, and the upper portion 16 of the housing 12 is removed. The filter cartridge 18 may then be replaced with a replacement filter cartridge 18 by utilizing the first embodiment of the identifying means 21, wherein the protrusion 84 on the interface 72 may or may not matingly engage the open-ended aperture 62 in the wall 60 of the boss 52. If the protrusion 84 is received within the open-ended aperture 62, the filter cartridge 18 will seat properly within the first diameter bore 56 of the boss 52, thereby indicating that the micron rating of the filter media 22 of the filter cartridge 18 is desirable. If the protrusion 84 is not received by the open-ended aperture 62, then the micron rating of the filter media 22 of the filter cartridge 18 is not desirable, and the replacement filter cartridge 18 is removed and replaced with a proper filter cartridge 18.

If the other embodiments of the identifying means 21 are utilized, the interface 72 of the replacement filter cartridge 18 is seated within the first diameter bore 56 of the boss 52, and the proximity sensor 92 senses either the position or the strength of the magnet 86. In the alternative, the RFID reader 92 may be used instead of the proximity sensor 92, and the RFID tag 86 may be used instead of the magnet 86, wherein the RFID reader 92 reads the information from the RFID tag 86. The proximity sensor or the RFID reader 92 provides a signal indicating whether the micron rating of the filter media 22 of the filter cartridge 18 is desirable or undesirable based on the position or strength of the magnet 86. The controller 96 may receive and interpret the signal from the proximity sensor or the RFID reader 92, thereby providing an indicator to the vehicle and/or operator of the vehicle as to whether the micron rating of the filter media 22 of the filter cartridge 18 is desirable or undesirable. If the micron rating of the filter media 22 of the replacement filter cartridge 18 is desirable, then the replacement of the filter cartridge 18 is complete. If the micron rating of the filter media 22 of the replacement filter cartridge 18 is not desirable, then the replacement of the filter cartridge 18 is removed and replaced with a desirable filter cartridge 18.

If the last embodiment of the identifying means 21 is used, the non-coaxially aligned first diameter bore 56 and the second diameter bore 58 of the boss 52 matingly receive the non-coaxially aligned cylindrical interface 72 and the cylindrical riser pipe 64, respectively, of the filter cartridge 18. If these components physically receive each other, then the filter cartridge 18 is proper secured in the housing 12, and the filter cartridge 18 is desirable for the fluid filter assembly 10. If these components do not physically receive each other, then the filter cartridge 18 is not properly secured in the housing 12, and the filter cartridge is desirable for the fluid filter assembly 10.

Once a proper replacement filter cartridge 18 is in place, the upper portion 16 of the housing 12 is replaced, and the collar 34 is threaded back on the lower portion 14 of the housing 12. The housing 12 is primed with fluid, and the vent cap 38 threaded back into the threaded aperture 40. The fluid filter assembly 10 is then ready for normal operation.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims, the scope is to be accorded the broadest interpretation so as to encompass all such modifications and equivalent structures as is permitted under the law.

What is claimed is:

1. A fluid filter assembly, comprising:
    an enclosed housing having an upper portion and a lower portion for holding fluid, wherein the upper portion is vertically above said lower portion to allow fluid to rise from the lower portion to the upper portion, and a boss formed in the lower portion and having a first diameter bore and a second diameter bore axially offset from the first diameter bore;
    a filter cartridge having an end cap connected to an end of a filter media and disposed within said housing for filtering fluid within said housing, said filter cartridge having an upper portion disposed within said upper portion of said housing and a lower portion disposed within said lower portion of said housing;
    a vent cap engageable with the upper portion of the housing such that said filter cartridge is entirely enclosed within said housing, said vent cap being configured to allow atmospheric pressure into the housing prior to removing the filter cartridge;
    a substantially cylindrical interface integrally formed with said end cap and connected to and extending from said lower portion of said filter cartridge, said substantially cylindrical interface having a continuous, substantially cylindrical outer wall, an annular cross-sectional configuration, and a through bore extending substantially parallel to the outer wall, the substantially cylindrical interface being matingly received by said first diameter bore of the boss, and the through bore being coaxially aligned with the second diameter bore of the boss for securing and locating said filter cartridge in said housing, wherein a longitudinal axis of said substantially cylindrical interface is offset from a longitudinal axis of said filter cartridge and a longitudinal axis of the through bore is coaxially aligned with the longitudinal axis of the filter cartridge to further identify, secure and locate the filter cartridge in said housing; and means for identifying at least one characteristic of said filter cartridge to indicate whether said at least one characteristic is proper for the fluid filter assembly, wherein said at least one characteristic is at least one of a micron rating less than or equal to a specific micron rating, a specific filter capacity, a specific water separation capability, manufactured by a specific manufacturer, manufactured on or before a specific date, manufactured on or after a specific date, manufactured in a specific country, or a specific replacement date.

2. The fluid filter assembly stated in claim 1, wherein said identifying means further comprises:
a magnet disposed in a predetermined position in a free end of said substantially cylindrical interface, wherein said predetermined position of said magnet corresponds to said at least one characteristic of said filter cartridge;
a proximity sensor disposed in a predetermined position within a bottom surface of said boss in said housing, wherein said bottom surface of said boss defines a bottom of said first diameter bore; and
said proximity sensor sensing position of said magnet and providing a signal as to whether said at least one characteristic of said filter cartridge is desirable.

3. The fluid filter assembly stated in claim 1, wherein said identifying means further comprises:
a magnet disposed in a predetermined position in a free end of said substantially cylindrical interface, and said magnet having a predetermined magnetic characteristic corresponding to said at least one characteristic of said filter cartridge; and
a proximity sensor disposed in a predetermined position within said boss of said housing and sensing said predetermined magnetic characteristic of said magnet, wherein said proximity sensor provides a signal corresponding to said predetermined magnetic characteristic of said magnet and indicating whether said at least one characteristic of said filter cartridge is desirable.

4. The fluid filter assembly stated in claim 1, wherein said identifying means further comprises:
an RFID tau disposed in said substantially cylindrical interface, and said RFID tag storing electronic information regarding said filter cartridge; and
an RFID reader disposed in said boss of said housing, and said RFID reader transmitting and receiving a signal to and from said RFID tag, respectively, wherein said RFID reader provides a signal corresponding to said electronic information from said RFID tag regarding said filter cartridge indicating whether said filter cartridge is desirable.

5. The fluid filter assembly as stated in claim 2, further comprising:
a controller for receiving and interpreting said signal from said proximity sensor, and said controller providing an indicator as to whether said at least one characteristic of said filter cartridge is desirable.

6. The fluid filter assembly as stated in claim 3, further comprising:
a controller for receiving and interpreting said signal from said proximity sensor, and said controller providing an indicator as to whether said at least one characteristic of said filter cartridge is desirable.

7. The fluid filter assembly as stated in claim 4, further comprising:
a controller for receiving and interpreting said signal from said RFID reader, and said controller providing an indicator as to whether said filter cartridge is desirable.

8. The fluid filter assembly as stated in claim 1, wherein said identifying means further comprises:
said boss having a second diameter bore extending below and in communication with said first diameter bore, and said second diameter bore being smaller than said first diameter bore wherein said first diameter bore and said second diameter bore are non-coaxially aligned;
a substantially cylindrical riser pipe matingly received within a through bore in said substantially cylindrical interface wherein said substantially cylindrical interface and said substantially cylindrical riser pipe are non-coaxially aligned; and
said substantially cylindrical interface matingly engaging said first diameter bore, and said substantially cylindrical riser pipe matingly engaging said second diameter bore for properly positioning and securing said filter cartridge in said housing and indicating whether said filter cartridge is desirable.

9. The fluid filter assembly as stated in claim 8, further comprising:
said substantially cylindrical riser pipe having at least one groove extending axially along an exterior surface of said substantially cylindrical riser pipe.

10. A fluid filter assembly having a required micron rating that is proper for said fluid filter assembly, comprising:
a housing having a boss formed therein, said boss having a first diameter bore axially spaced and adjacent a second diameter bore and in communication with one another, wherein a longitudinal axis of said first diameter bore is off set from a longitudinal axis of said second diameter bore, and a riser pipe is seated within said second diameter bore;
a filter cartridge having an end cap connected to an end of a filter media and disposed within said housing for filtering fluid and having a micron rating, wherein said housing includes closed upper and lower portions for containing fluid such that said filter cartridge is entirely enclosed within said housing to allow for pressurization of the fluid filter assembly;
a substantially cylindrical interface integrally connected to said end cap and extending away from said filter cartridge, said substantially cylindrical interface being unitary in construction and having a continuous periphery outer wall with an annular cross-sectional configuration and a through bore extending substantially parallel to the outer wall for receiving said riser pipe and an outer diameter of the outer wall matingly received by said first diameter bore for identifying, securing and locating said filter cartridge in said housing, wherein a longitudinal axis of said substantially cylindrical interface is offset from a longitudinal axis of said filter cartridge and a longitudinal axis of the through bore is coaxially aligned with the longitudinal axis of the filter cartridge and the riser pipe; and
means for identifying at least one characteristic of said filter cartridge to indicate whether said at least one characteristic is proper for the fluid filter assembly, wherein said at least one characteristic is at least one of a micron rating less than or equal to a specific micron rating, a specific filter capacity, a specific water separation capability, manufactured by a specific manufacturer, manufactured on or before a specific date, manufactured on or after a specific date, manufactured in a specific country, or a specific replacement date.

11. The fluid filter assembly as stated in claim 1, wherein said identifying means further comprises:
   a protrusion formed on one of either said substantially cylindrical interface or said boss, and said protrusion having a predetermined size corresponding to a micron rating of said filter cartridge; and
   an aperture formed in the other of said substantially cylindrical interface or said boss, said aperture having a predetermined size corresponding to an acceptable micron rating for said fluid filter assembly, wherein said protrusion is smaller than and received by said aperture if said filter cartridge has a micron rating greater than or equal to said acceptable micron rating of said fluid filter assembly, and wherein said protrusion is larger than and cannot be received by said aperture if said filter cartridge has a micron rating less than said acceptable micron rating of said fluid filter assembly.

12. A fluid filter assembly, comprising:
   a housing having a lower portion with a boss formed therein having a first diameter bore and a second diameter bore wherein the first diameter bore is axially offset from a longitudinal axis of the second diameter bore and an upper portion opposite and connected to said lower portion to form an enclosure for containing fluid; and
   a filter cartridge disposed within said housing and including a lower portion with an end cap connected to a filter media and an upper portion opposite said lower portion, said end cap being integrally formed with an interface extending outwardly therefrom, the interface having an annular cross-sectional, cylindrical configuration and defining a continuous periphery outer wall and a through bore extending substantially parallel to the outer wall, the interface being configured for engagement with the housing to secure and properly locate the filter cartridge, wherein the interface is eccentrically positioned with respect to a central longitudinal axis of the filter cartridge and the through bore is eccentrically positioned with respect to the interface such that the central longitudinal axis of the filter cartridge is aligned with a central longitudinal axis of the through bore.

13. The fluid filter assembly as stated in claim 12, wherein the continuous outer wall of the interface is substantially cylindrical in configuration.

14. The fluid filter assembly as stated in claim 12, wherein the boss includes a first bore with a first diameter, the interface being configured for insertion into the first bore.

15. The fluid filter assembly as stated in claim 14, wherein the boss further includes a second bore with a second diameter, the second bore being spaced axially from the first bore.

16. The fluid filter assembly as stated in claim 15, wherein the first and second bores are in communication.

17. The fluid filter assembly as stated in claim 15, further including a riser pipe seated within the second bore.

18. The fluid filter assembly as stated in claim 17, wherein the riser pipe is configured for insertion into the through bore of the interface.

19. The fluid filter assembly as stated in claim 12, further including means for identifying at least one characteristic of the filter cartridge to indicate whether the at least one characteristic is proper for the fluid filter assembly, wherein said at least one characteristic is at least one of a micron rating less than or equal to a specific micron rating, a specific filter capacity, a specific water separation capability, manufactured by a specific manufacturer, manufactured on or before a specific date, manufactured on or after a specific date, manufactured in a specific country, or a specific replacement date.

* * * * *

UNITED STATES PATENT AND TRADEMARK OFFICE
CERTIFICATE OF CORRECTION

PATENT NO. : 11,975,279 B2
APPLICATION NO. : 13/349183
DATED : May 7, 2024
INVENTOR(S) : Zdzislaw W. Chajec et al.

It is certified that error appears in the above-identified patent and that said Letters Patent is hereby corrected as shown below:

In the Claims

In Column 11, Line 52, should read:
"an RFID tag disposed in said substantially cylindrical"

Signed and Sealed this
Eleventh Day of June, 2024

Katherine Kelly Vidal
*Director of the United States Patent and Trademark Office*